United States Patent
Ando et al.

(10) Patent No.: US 10,625,741 B2
(45) Date of Patent: Apr. 21, 2020

(54) VEHICLE CONTROL DEVICE

(71) Applicant: ADVICS CO., LTD., Kariya-shi (JP)

(72) Inventors: Hiroyuki Ando, Kariya (JP); Masayuki Asano, Kariya (JP); Yukio Mori, Kariya (JP); Yosuke Ohmori, Kariya (JP)

(73) Assignee: ADVICS CO., LTD., Kariya-shi (JP)

( * ) Notice: Subject to any disclaimer, the term of this patent is extended or adjusted under 35 U.S.C. 154(b) by 185 days.

(21) Appl. No.: 15/737,952

(22) PCT Filed: Jun. 24, 2016

(86) PCT No.: PCT/JP2016/068760
§ 371 (c)(1),
(2) Date: Dec. 19, 2017

(87) PCT Pub. No.: WO2016/208702
PCT Pub. Date: Dec. 29, 2016

(65) Prior Publication Data
US 2018/0186374 A1   Jul. 5, 2018

(30) Foreign Application Priority Data
Jun. 25, 2015   (JP) ................................ 2015-127631

(51) Int. Cl.
*B60W 30/14*   (2006.01)
*B60W 10/18*   (2012.01)
(Continued)

(52) U.S. Cl.
CPC ....... *B60W 30/143* (2013.01); *B60K 31/0008* (2013.01); *B60W 10/18* (2013.01);
(Continued)

(58) Field of Classification Search
CPC . B60K 31/0008; B60W 30/143; B60W 10/18; B60W 30/14
See application file for complete search history.

(56) References Cited

U.S. PATENT DOCUMENTS

2001/0014845 A1*  8/2001  Minowa ................ A61B 3/032
                                                                  701/84
2004/0153233 A1   8/2004  Minowa et al.
(Continued)

FOREIGN PATENT DOCUMENTS

| CN | 103718220 A | 4/2014 |
| FR | 2 996 513 A1 | 4/2014 |

(Continued)

OTHER PUBLICATIONS

Extended European Search Report dated Apr. 3, 2019 in European Patent Application No. 16814471.5, 8 pages.
(Continued)

*Primary Examiner* — Abby Y Lin
*Assistant Examiner* — Renee LaRose
(74) *Attorney, Agent, or Firm* — Oblon, McClelland, Maier & Neustadt, L.L.P.

(57) ABSTRACT

A vehicle control device is configured such that if, during an automatic driving mode in which a vehicle is automatically driven regardless of operations by a driver, such automatic driving mode is temporarily stopped by a prescribed operation by the driver and a normal driving mode in which the vehicle is driven in accordance with the operations of the driver is entered, and thereafter the automatic driving mode is returned to from the normal driving mode, specific control is implemented in the post-return automatic driving mode, such control being determined on the basis of the driving state of the vehicle during the normal driving mode before the return.

2 Claims, 8 Drawing Sheets

(51) Int. Cl.
*B60W 50/00* (2006.01)
*B60K 31/00* (2006.01)
*B60W 40/107* (2012.01)
*G05D 1/00* (2006.01)

(52) U.S. Cl.
CPC .......... *B60W 30/14* (2013.01); *B60W 40/107* (2013.01); *G05D 1/0088* (2013.01); *B60W 2050/0008* (2013.01); *B60W 2050/0012* (2013.01); *B60W 2050/0096* (2013.01); *B60W 2520/105* (2013.01); *B60W 2540/10* (2013.01); *B60W 2710/18* (2013.01); *B60W 2720/106* (2013.01)

(56) References Cited

U.S. PATENT DOCUMENTS

| | | |
|---|---|---|
| 2007/0106448 A1 | 5/2007 | Minowa et al. |
| 2009/0048755 A1 | 2/2009 | Tokimasa et al. |
| 2013/0124012 A1 | 5/2013 | Shida et al. |

FOREIGN PATENT DOCUMENTS

| | | |
|---|---|---|
| JP | 62-216838 A | 9/1987 |
| JP | 2001-018680 A | 1/2001 |
| JP | 2002-225689 A | 8/2002 |
| JP | 2003-320868 A | 11/2003 |
| JP | 2007-276777 A | 10/2007 |
| JP | 2008-132980 A | 6/2008 |
| JP | 2009-18681 A | 1/2009 |
| JP | 2009-161180 A | 7/2009 |
| JP | 2012-030666 A | 2/2012 |
| WO | 2012/014033 A1 | 2/2012 |

OTHER PUBLICATIONS

International Search Report dated Aug. 16, 2016 in PCT/JP2016/068760, filed on Jun. 24, 2016.

* cited by examiner

FIG.2

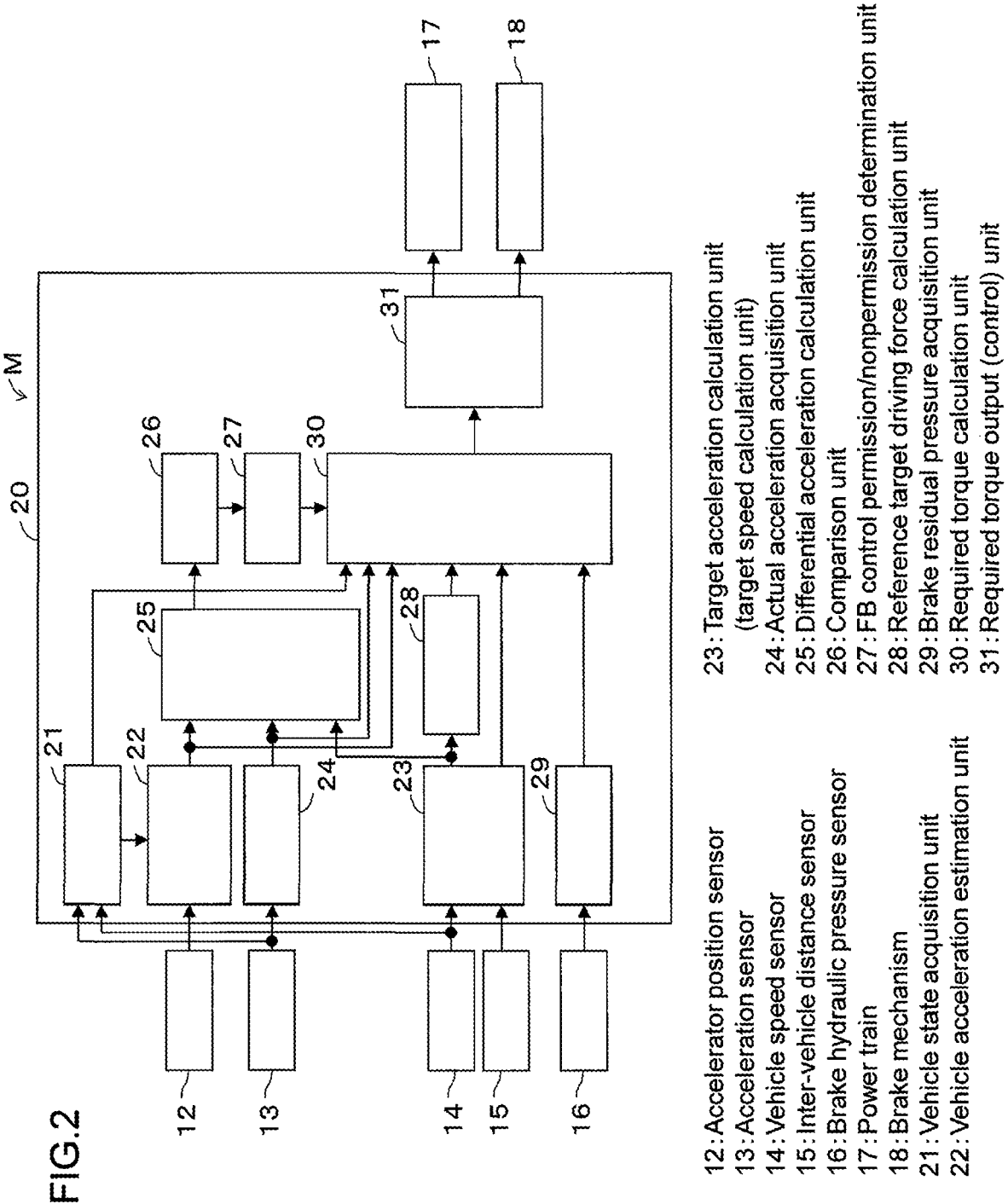

12: Accelerator position sensor
13: Acceleration sensor
14: Vehicle speed sensor
15: Inter-vehicle distance sensor
16: Brake hydraulic pressure sensor
17: Power train
18: Brake mechanism
21: Vehicle state acquisition unit
22: Vehicle acceleration estimation unit 23: Target acceleration calculation unit (target speed calculation unit)
24: Actual acceleration acquisition unit
25: Differential acceleration calculation unit
26: Comparison unit
27: FB control permission/nonpermission determination unit
28: Reference target driving force calculation unit
29: Brake residual pressure acquisition unit
30: Required torque calculation unit
31: Required torque output (control) unit

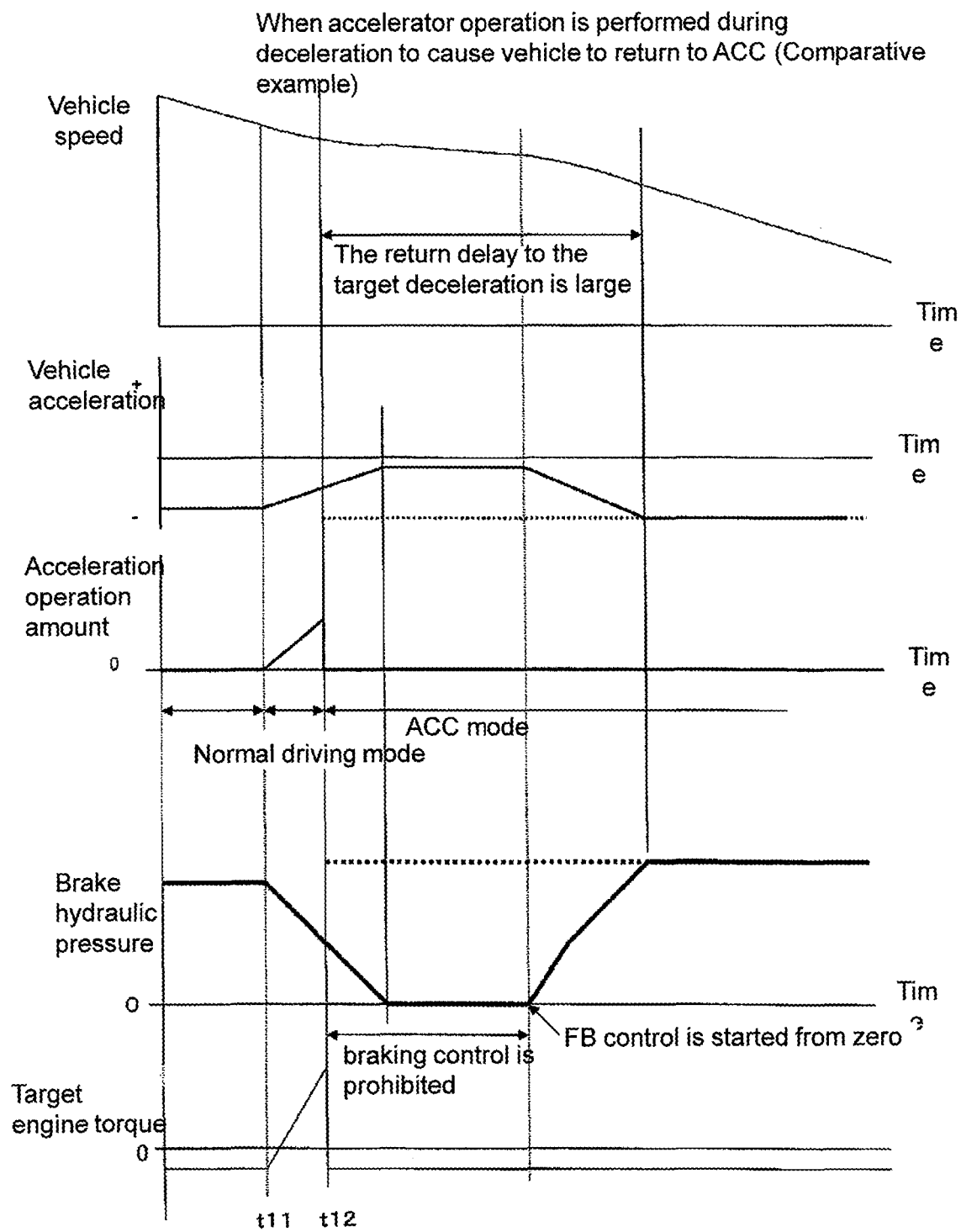

VEHICLE CONTROL DEVICE

TECHNICAL FIELD

The present invention relates to a vehicle control device.

BACKGROUND ART

Conventionally, in cruise control regulation serving as an example of automatic driving control, after an automatic driving mode (in cruise control regulation) is switched to a normal driving mode by an accelerator operation of a driver in the cruise control regulation (in automatic driving mode), the vehicle may return to the automatic driving mode by ending the accelerator operation (canceling the accelerator operation). At this time, an excessive acceleration change may occur in the vehicle depending on operations executed immediately before the returning and driving states of the vehicle. In order to cope with this, in Patent Literature 1, the brake control is suppressed for a predetermined period of time from the time of returning.

CITATION LIST

Patent Literature

Patent Literature 1: JP-A-2001-018680

SUMMARY OF INVENTION

Technical Problems

In the vehicle control device described in Patent Literature 1 described above, since the brake control is suppressed at the time of returning executed by the accelerator operation during deceleration, the deceleration may unexpectedly suddenly change due to brake losing. On the other hand, at the time of returning by the accelerator operation during acceleration, an excessive acceleration change occurring in the vehicle is required to be further suppressed.

The present invention has been made to solve the above problems and has as its object to smoothly return from a normal driving mode to an automatic driving mode in the automatic driving mode in a vehicle control device.

Solutions to Problems

In order to solve the above-mentioned problems, an invention of a vehicle control device includes: a driving source applying positive/negative driving force to a vehicle; a braking mechanism disposed independently of the driving source and generating braking force to the vehicle; and an acceleration/deceleration control unit that controls the driving source or/and braking mechanism based on a target speed or a target acceleration to control an acceleration of the vehicle, and the acceleration/deceleration control unit is configured such that, in an automatic driving mode in which the vehicle is automatically driven regardless of an operation of a driver, after the automatic driving mode is temporarily stopped by a predetermined operation of the driver and switched to a normal driving mode in which the vehicle is driven according to an operation of the driver, when the normal driving mode returns to the automatic driving mode, specific control set based on a driving state of the vehicle in the normal driving mode before the returning is executed in the automatic driving mode after the returning.

Advantageous Effects of Invention

According to this, the acceleration/deceleration control unit of the vehicle control device, when returning from the normal driving mode to the automatic driving mode in the automatic driving mode, performs the specific control set based on the driving state of the vehicle in the normal driving mode before returning in the automatic driving mode after returning. As a result, the driving mode can be smoothly returned from the normal driving mode to the automatic driving mode in the automatic driving mode.

BRIEF DESCRIPTION OF DRAWINGS

FIG. 2 is a block diagram showing the details of one embodiment of the vehicle control device according to the present invention.

FIG. 8 is a time chart of a vehicle control device according to a comparative example (conventional art) when an accelerator operation is performed during deceleration of a vehicle to return the vehicle to ACC.

DESCRIPTION OF EMBODIMENTS

Figure 1:
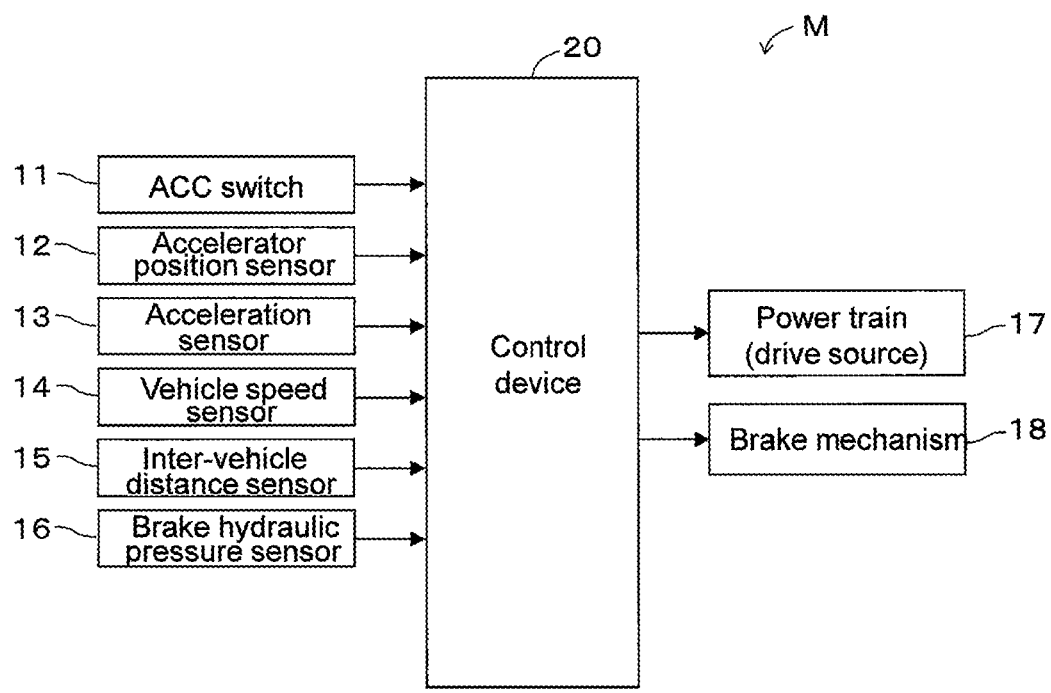
FIG. 1 is a block diagram showing an embodiment of a vehicle control device according to the present invention.

Hereinafter, an embodiment to which a vehicle control device according to the present invention is applied will be described with reference to the drawings. As shown in FIG. 1, an own vehicle M (vehicle M) includes an ACC switch 11, an accelerator position sensor 12, an acceleration sensor 13, a vehicle speed sensor 14, an inter-vehicle distance sensor 15, a brake hydraulic pressure sensor 16, a power train 17, a brake mechanism 18, and a vehicle control device 20.

The ACC switch 11 is an on/off switch for ACC (adaptive cruise control). An on/off state of the ACC switch 11 is output to the vehicle control device 20. The ACC switch 11 is a switch to start/stop ACC. The ACC controls traveling of an own vehicle to perform follow-up traveling such that a constant inter-vehicle distance to a preceding vehicle is maintained, that is, a predetermined distance to the preceding vehicle is maintained. The ACC also includes cruise control for controlling the traveling of the own vehicle so that the speed of the own vehicle is constantly kept at a set speed (set speed). An inter-vehicle distance setting switch may be disposed. The inter-vehicle distance setting switch is a switch to set an inter-vehicle distance between a preceding vehicle and the own vehicle in the ACC, and has settings of a plurality of steps depending on a plurality of distances.

Note that the ACC is an example of automatic driving in which the vehicle M is automatically driven regardless of an operation of a driver. As another automatic driving, driving in which the vehicle M is automatically parked is given. In addition, in normal driving, the vehicle M is driven (traveled) according to an operation for the driver. An automatic driving mode means that a driving method of the vehicle is an automatic driving method (style), and a normal driving mode means that the driving method is a normal driving method (style).

The accelerator position sensor 12 is disposed near an accelerator pedal (not shown), detects an operation amount of the accelerator pedal, and outputs the detection result to the vehicle control device 20.

The acceleration sensor 13 is a sensor that detects an acceleration of the own vehicle M. The acceleration sensor 13 detects at least an acceleration in a forward/backward direction of a vehicle. A detection signal from the acceleration sensor 13 is output to the vehicle control device 20.

The vehicle speed sensor 14 is a sensor detecting a vehicle speed of the own vehicle M. The vehicle speed sensor 14 includes, for example, a wheel speed sensor that detects a wheel speed serving as a speed of a wheel of the vehicle M and a vehicle speed sensor that detects a rotation speed of an output shaft outputting driving force to a drive wheel. A detection signal from the vehicle speed sensor 14 is output to the vehicle control device 20. In the present embodiment, hereinafter, an "acceleration" is handled as an "acceleration in a forward/backward direction of the vehicle" unless otherwise specified.

The inter-vehicle distance sensor 15 detects an inter-vehicle distance from the own vehicle to a target and outputs a detection signal to the vehicle control device 20. The inter-vehicle distance sensor 15 includes, for example, a scan radar using a millimeter wave, a scan laser radar using a semiconductor laser, a CCD camera, and the like.

The brake hydraulic pressure sensor 16 detects a brake fluid pressure of the brake mechanism 18 and outputs a detection signal thereof to the vehicle control device 20. The brake fluid pressure of the brake mechanism 18 is, for example, a fluid pressure of a master cylinder and a fluid pressure of a wheel cylinder. Positive driving force is driving force in a direction in which the vehicle is accelerated, and negative driving force is driving force in a direction in which the vehicle is decelerated. As the negative driving force, engine braking, regenerative braking force, or the like are given.

The power train 17 is a driving source applying either positive or negative driving force to the vehicle M. The driving source is, for example, an internal combustion engine or a motor, and may be a hybrid system including an engine and a motor.

The brake mechanism 18 is disposed independently of the power train 17, and is a braking mechanism generating braking force on the vehicle M. The brake mechanism 18 is a so-called hydraulic brake mechanism, and is constituted by a master cylinder, a wheel cylinder, a brake actuator that can execute ABS and ESC, and the like. Note that the brake mechanism 18 is configured to be able to generate braking force on the vehicle M (or wheels) even though a driver does not step on the brake pedal. The brake mechanism 18 is a device that independently and actively gives braking force to all the wheels regardless of the presence/absence of an operation of the brake pedal.

The vehicle control device 20 includes a vehicle state acquisition unit 21, a vehicle acceleration estimation unit 22, a target acceleration calculation unit (target speed calculation unit) 23, an actual acceleration acquisition unit 24, a differential acceleration calculation unit 25, a comparison unit 26, a feedback control (which may also be referred to as FB control hereinafter) permission/nonpermission determination unit 27, a reference target driving force calculation unit 28, a brake residual pressure acquisition unit 29, a required torque calculation unit 30, and a required torque output unit 31.

The vehicle control device 20 is an acceleration/deceleration control unit that controls an acceleration of the vehicle M by controlling the power train 17 and/or the brake mechanism 18 based on a target speed or a target acceleration. The vehicle control device 20, in an automatic driving mode in which the vehicle M is automatically driven regardless of an operation of a driver, after the automatic driving mode is temporarily stopped by a predetermined operation of the driver to set a normal driving mode in which the vehicle M is driven according to an operation of the driver, performs control to return the vehicle from the normal driving mode to the automatic driving mode. In the embodiment, the predetermined operation is an accelerator operation to operate the accelerator pedal.

In addition, the vehicle control device 20 performs specific control set based on a driving state of the vehicle M in the normal driving mode set before returning in the automatic driving mode set after the returning. In the specific control, until a differential acceleration, which is a deviation between a vehicle acceleration (estimated acceleration) estimated by the vehicle acceleration estimation unit 22 and a target acceleration, becomes equal to or less than a determination threshold value after a time point of returning, feedback control related to the speed or acceleration of the vehicle M is prohibited.

Also, in the specific control, reference target driving force (described later) is set to zero at the time point of returning, and target driving force is changed at a predetermined changing speed up to the reference target driving force while the feedback control is being prohibited.

Further, in the specific control, the braking force (brake residual pressure described later) that was generated immediately before the time point of returning is set as the target braking force at the time point immediately after the time point of returning.

The vehicle state acquisition unit 21 acquires a vehicle state which is a traveling state or a driving state of the vehicle M. For example, the vehicle state acquisition unit 21 acquires an acceleration of the vehicle M from the acceleration sensor 13, and acquires a speed of the vehicle from the vehicle speed sensor 14. The acceleration and the speed of the vehicle M are included in the vehicle state.

After the accelerator operation has changed largely, the acceleration of the vehicle does not follow promptly, and a relationship between an engine torque and a vehicle acceleration becomes different from a usual state. For example, even though the accelerator is closed to quickly decrease an engine torque, the decrease in acceleration of the vehicle may not follow up. The vehicle acceleration estimation unit 22 estimates the acceleration of the vehicle M in the automatic driving mode after returning from the driving state of the vehicle M in the normal driving mode before returning. That is, the vehicle acceleration estimation unit 22 calculates an estimated acceleration of the vehicle M.

For example, the vehicle acceleration estimation unit 22 receives an accelerator position from the accelerator position sensor 12, receives a vehicle state from the vehicle state acquisition unit 21, and calculates an estimated acceleration of the vehicle M by using the input parameters in a vehicle response model. The vehicle response model is a model obtained by mathematically expressing an inter-vehicle distance response characteristic from the own vehicle to a vehicle immediately preceding the own vehicle. That is, this vehicle response model is obtained by modeling so-called driver follow-up set on the assumption that the driving operation performed when the driver makes the own vehicle follow a preceding vehicle is adjusted such that an inter-vehicle distance to the preceding vehicle is set to a value depending on an inter-vehicle time and a relative speed to the preceding vehicle is set to 0.

Alternatively, instead of the driver follow-up model, a dynamic characteristic model of the drive system based on the characteristics of a torque converter, a vehicle mass, a rotational inertia of a rotating member (such as a wheel, a drive shaft, a propeller shaft, or the like) rotating with traveling of the vehicle, and the like may be used to calculate an estimated acceleration. More specifically, a torque input to a mission side is estimated based on the engine side rotational speed and the mission side rotational speed of the torque converter, the torque converter characteristics, and the like, and an acceleration of the vehicle may be calculated based on the estimated input torque and braking force when braking force is applied by the brake, a vehicle mass, and a rotational inertia obtained in advance, or the like.

The actual acceleration acquisition unit 24 acquires an acceleration of the vehicle M (actual acceleration which is actually obtained) from the acceleration sensor 13. The actual acceleration acquisition unit 24 may also acquire the acceleration of the vehicle M (actual acceleration which is actually obtained) from the vehicle state acquisition unit 21.

The differential acceleration calculation unit 25 calculates, based on the estimated acceleration input from the vehicle acceleration estimation unit 22 and the target acceleration input from the target acceleration calculation unit 23, a differential acceleration which is a difference between both the accelerations. The differential acceleration calculation unit 25 may also calculate, based on the estimated acceleration input from the vehicle acceleration estimation unit 22 and the actual acceleration input from the actual acceleration acquisition unit 24, the differential acceleration which is the difference between both the accelerations.

The comparison unit 26 compares the differential acceleration input from the differential acceleration calculation unit 25 with the determination threshold value to output a comparison result to the FB control permission/nonpermission determination unit 27. For example, the comparison unit 26 determines the magnitudes of the differential acceleration and the determination threshold value.

The FB control permission/nonpermission determination unit 27 determines whether FB control is prohibited based on the comparison result input from the comparison unit 26. For example, when the differential acceleration is larger than the determination threshold value (that is, when the estimated acceleration is largely different from the target acceleration), the FB control permission/nonpermission determination unit 27 prohibits the FB control. On the other hand, when the differential acceleration is smaller than the determination threshold value (that is, when the estimated acceleration is approximate to the target acceleration), the FB control permission/nonpermission determination unit 27 determines to permit the FB control. The FB control is feedback control related to the speed or acceleration of the vehicle M.

The reference target driving force calculation unit 28 calculates reference target driving force which is a reference of the target driving force based on at least one of the target acceleration input from the target acceleration calculation unit 23 and the target speed input from the target speed calculation unit. The target driving force is equivalent to each required torque required for the power train 17 and the brake mechanism. The required torque required for the power train 17 is a required driving torque. A required torque required for the brake mechanism is a required braking torque.

The brake residual pressure acquisition unit 29 receives a brake hydraulic pressure of the brake mechanism 18 from the brake hydraulic pressure sensor 16. The brake residual pressure acquisition unit 29 acquires a brake fluid pressure (that is, a brake fluid pressure corresponding to braking force) generated at a time point immediately before the returning as the brake residual pressure.

The required torque calculation unit 30 calculates target driving force based on at least one of the target acceleration input from the target acceleration calculation unit 23 and the target speed input from the target speed calculation unit, the actual acceleration input from the actual acceleration acquisition unit 24, and the vehicle speed input from the vehicle state acquisition unit 21. At this time, the required torque calculation unit 30 calculates an FB control amount for FB control and an FF control amount for feedforward control (which may also be referred to as the FF control hereinafter). The required torque calculation unit 30 calculates the target driving force based on the calculated FB control amount and the calculated FF control amount. For example, the target driving force is the sum of the FB control amount and the FF control amount.

The FB control is feedback control related to the speed or acceleration of the vehicle, and is, for example, FB control which makes the actual acceleration equal to the target acceleration. The FB control amount is a value calculated based on the difference between the actual acceleration and the target acceleration. The FF control is feedforward control related to the speed or acceleration of the vehicle, and is, for example, control to calculate the target driving force generating a target acceleration in a predetermined state serving as a reference according to a predetermined calculation rule. The FF control amount is, for example, a value calculated based on the vehicle speed and the target acceleration.

The required torque output unit 31 outputs the required torque (target driving force and/or target braking force) input from the required torque calculation unit 30 to the power train 17 and/or the brake mechanism 18. That is, the required torque output unit 31 is a drive source control unit that controls the power train 17 based on the required torque input from the required torque calculation unit 30. The required torque output unit 31 is a brake mechanism control unit that controls the brake mechanism 18 based on the required torque input from the required torque calculation unit 30.

Note that, in the above-described specific control, at the time point of returning, the required torque calculated in the specific control in which the reference target drive force is set to zero and the target driving force is changed at a predetermined change rate to the reference target driving force while the feedback control is being prohibited, is calculated by the required torque calculation unit 30.

In the specific control described above, the required torque calculated in the specific control that sets the braking force (brake residual pressure (described later)) generated at the time point immediately before the returning as target braking force set at the time point immediately after the returning is also calculated by the required torque calculation unit 30.

Figure 3:
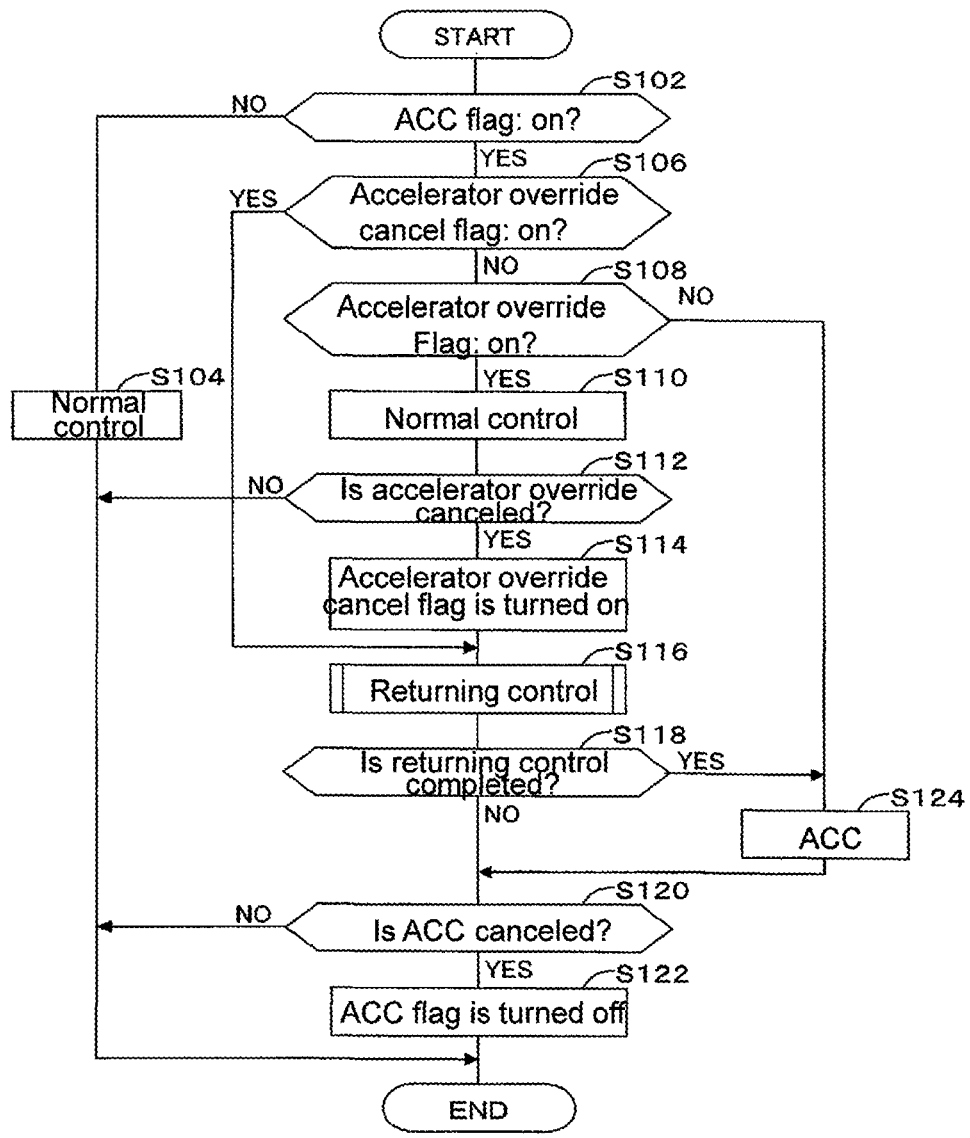
FIG. 3 is a flowchart of a control program executed by the vehicle control device shown in FIG. 1.

Further, the operation performed by the above-described vehicle control device 20 will be described with reference to the flowchart shown in FIG. 3. The vehicle control device 20 executes a program according to the flowchart at predetermined short time intervals.

In step S102, the vehicle control device 20 determines whether an ACC flag F1 is on. The ACC flag F1 is a flag indicating whether a driving method of the vehicle M is set to ACC. When the ACC flag F1 is on, the driving method of the vehicle is set to the ACC, and when the ACC flag F1 is off, the driving method of the vehicle is not set to the ACC (canceled). When the ACC flag F1 is off, the vehicle control device 20 determines "NO" in step S102, and performs normal driving in step S104.

When a driver does not perform the predetermined operation (accelerator operation) in the ACC (in the automatic driving mode), the vehicle control device 20 performs the ACC (step S124). Specifically, when the accelerator operation is not performed, an accelerator override cancel flag F2 is off and an accelerator override flag F3 is also off, so that the vehicle control device 20 determines "NO" in steps S106 and S108 to shift the program to step S124.

The accelerator override cancel flag F2 is a flag indicating whether the accelerator operation started in the ACC is canceled. When the accelerator override cancel flag F2 is on, the flag indicates that the accelerator operation started in the ACC is canceled. When the accelerator operation started in the ACC is canceled, the accelerator override cancel flag F2 is set to on. When the accelerator override cancel flag F2 is off, the flag indicates that the accelerator operation started in the ACC is not canceled. When the accelerator operation is not performed in the ACC, the accelerator override cancel flag F2 is set to off.

The accelerator override flag F3 is a flag indicating whether accelerator operation is executed in the ACC. When the accelerator override flag F3 is on, the flag indicates that the accelerator operation is executed in the ACC. When the accelerator operation is performed in the ACC, the accelerator override flag F3 is set to on. When the accelerator operation performed in the ACC is canceled, the accelerator override flag F3 is set to off.

On the other hand, when the driver performs a predetermined operation (accelerator operation) in the ACC (in the automatic driving mode), the vehicle control device 20 performs the normal driving according to the operation during the operation (until the predetermined operation is canceled) (step S110). More specifically, when the accelerator operation is performed, since the accelerator override cancel flag F2 is off and the accelerator override flag F3 is on, the vehicle control device 20 determines "NO" in step S106 and "YES" in step S108 to shift the program to step S110.

Since the accelerator override is not canceled until the driver finishes the predetermined operation (accelerator operation), the vehicle control device 20 determines "NO" in step S112. When the driver finishes the predetermined operation (accelerator operation), the accelerator override is canceled, so that the vehicle control device 20 determines "YES" in step S112. Then, in step S114, the vehicle control device 20 sets the accelerator override cancel flag F2 to on, and executes returning control in step S116. The returning control will be described in detail with reference to FIG. 4.

Since the accelerator override cancel flag F2 is set to on, the vehicle control device 20 determines "YES" in step S106 in the next and succeeding control cycle. Thus, the program can be shifted from step S106 to step S116.

Until the returning control is completed (finished) and the ACC is canceled by the operation of the driver, the vehicle control device 20 determines "NO" in steps S118 and S120, respectively to temporarily finish this flowchart.

When the returning control is completed (finished), but the ACC is not canceled by the operation of the driver, the vehicle control device 20 determines "YES" in step S118 to execute the ACC in step S124. The vehicle control device 20 returns from the normal control to the ACC.

When the ACC is canceled by the operation of the driver, the vehicle control device 20 determines "YES" in step S120, sets the ACC flag F1 to off, and temporarily finishes this flowchart.

Figure 4:
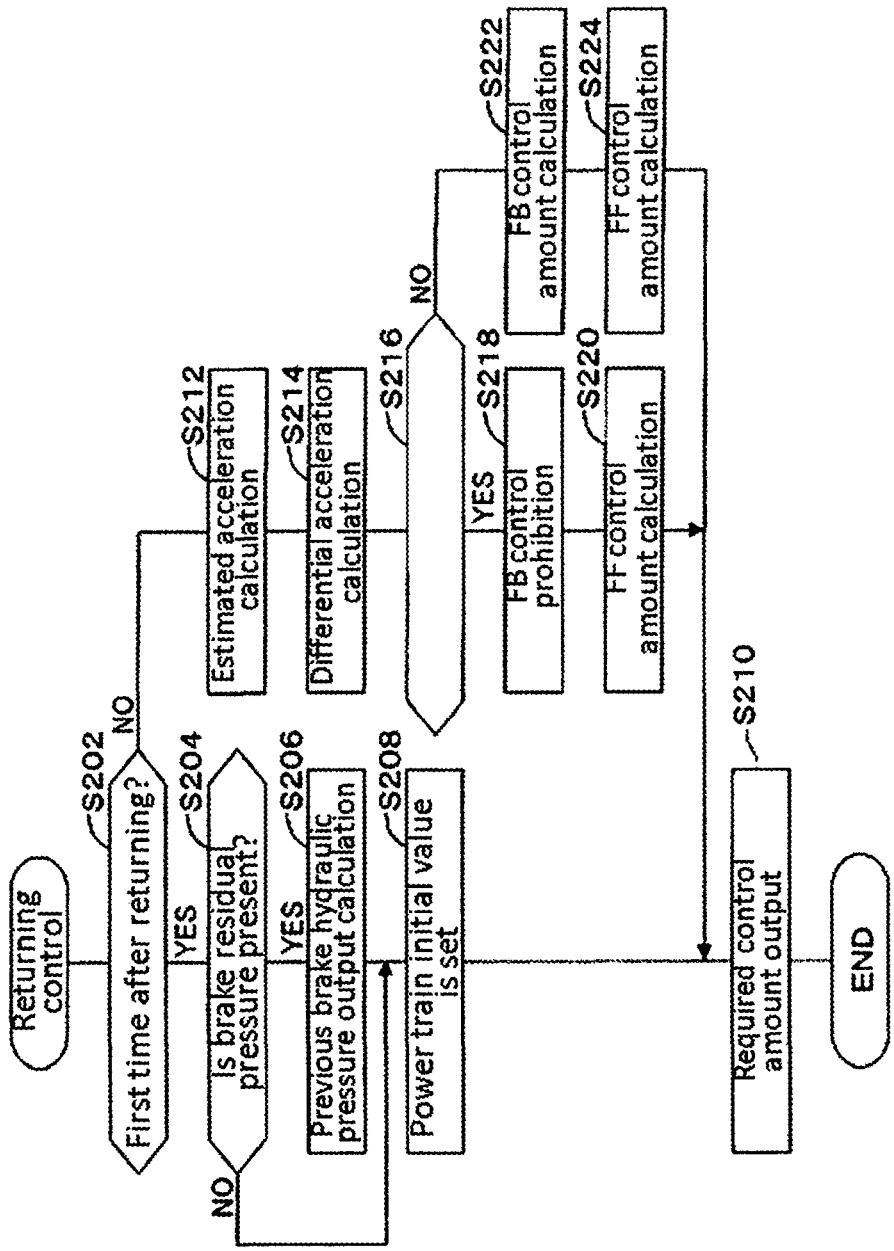
FIG. 4 is a flowchart of a control program (returning control) executed by the vehicle control device shown in FIG. 1.

The returning control will be described in detail with reference to FIG. 4.

In step S202, the vehicle control device 20 determines whether the control cycle is the first control cycle after a returning control start time point (after returning). When the control cycle is the first control cycle performed after the returning, the vehicle control device 20 determines "YES" in step S202 and shifts the program to step S204 and subsequent steps to set initial values of the target driving force and the target braking force (required torques thereof).

Specifically, when the brake residual pressure is present in the brake mechanism 18, that is, when the vehicle M is decelerated in traveling, the vehicle control device 20, in step S206, acquires a brake residual pressure obtained immediately before the returning as braking force generated at the time point immediately before the returning (acquired in the same way as that of the above-described brake residual pressure acquisition unit 29). Then, the vehicle control device 20 sets the acquired brake residual pressure as the initial value of the target braking force at the time point immediately after the returning.

Thereafter, in step S208, the vehicle control device 20 sets the initial value of the target driving force for the power train. For example, the initial value of the target driving force in this case is preferably a value corresponding to an idle rotation of the engine when the driving source is an engine, and may be zero.

When the brake residual pressure is not present in the brake mechanism 18, that is, when the vehicle M is accelerated in traveling or travels at a constant speed, since the possibility that the vehicle control device 20 need not generate braking force is high, the target braking force is not set. However, since the vehicle control device 20 needs to generate the driving force, the target driving force is set. Therefore, the vehicle control device 20 determines "NO" in step S204, and sets the initial value of the target driving force for the power train in step S208.

After the initial value is set, the vehicle control device 20 performs the specific control set based on the driving state of the vehicle M in the normal driving mode before the returning in the automatic driving mode after the returning. In the specific control, until a differential acceleration, which is a deviation between a vehicle acceleration (estimated acceleration) estimated by the vehicle acceleration estimation unit 22 and a target acceleration, becomes equal to or less than a determination threshold value after a time point of returning, feedback control related to the speed or acceleration of the vehicle M is prohibited.

Specifically, since the control cycle is the second or subsequent control cycle, the vehicle control device 20 determines "NO" in step S202 to shift the program to step S212 or later.

As in the above-described vehicle acceleration estimation unit 22, in step S212, the vehicle control device 20 calculates the estimated acceleration of the vehicle M in the automatic driving mode after the returning based on the driving state of the vehicle M in the normal driving mode before the returning.

In step S214, as in the differential acceleration calculation unit 25, the vehicle control device 20 calculates, based on the estimated acceleration and the target acceleration, the differential acceleration, which is the difference between both the accelerations.

In step S216, the vehicle control device 20 compares the differential acceleration with the determination threshold value as in the comparison unit 26 described above. When the differential acceleration is larger than the determination threshold value, the vehicle control device 20 determines "YES" in step S216 to shift the program to step S218. The vehicle control device 20, in step S218, prohibits the FB control and does not calculate the FB control amount in the same manner as that of the FB control permission/nonpermission determination unit 27 described above.

On the other hand, when the differential acceleration is smaller than the determination threshold value, the vehicle control device 20 determines "NO" in step S216 to shift the program to step S222. In step S222, the vehicle control device 20 permits the FB control as in the FB control permission/nonpermission determination unit 27 described above, and calculates the FB control amount as in the required torque calculation unit 30 described above.

In addition, in steps S220 and S224, the vehicle control device 20 calculates the FF control amount as in the required torque calculation unit 30 described above.

Then, as in the above-described required torque output unit 31, the vehicle control device 20, in step S210, outputs the required torque (target driving force and/or target braking force) calculated in steps S220 to S224 to the power train 17 and/or the brake mechanism 18.

Figure 5:
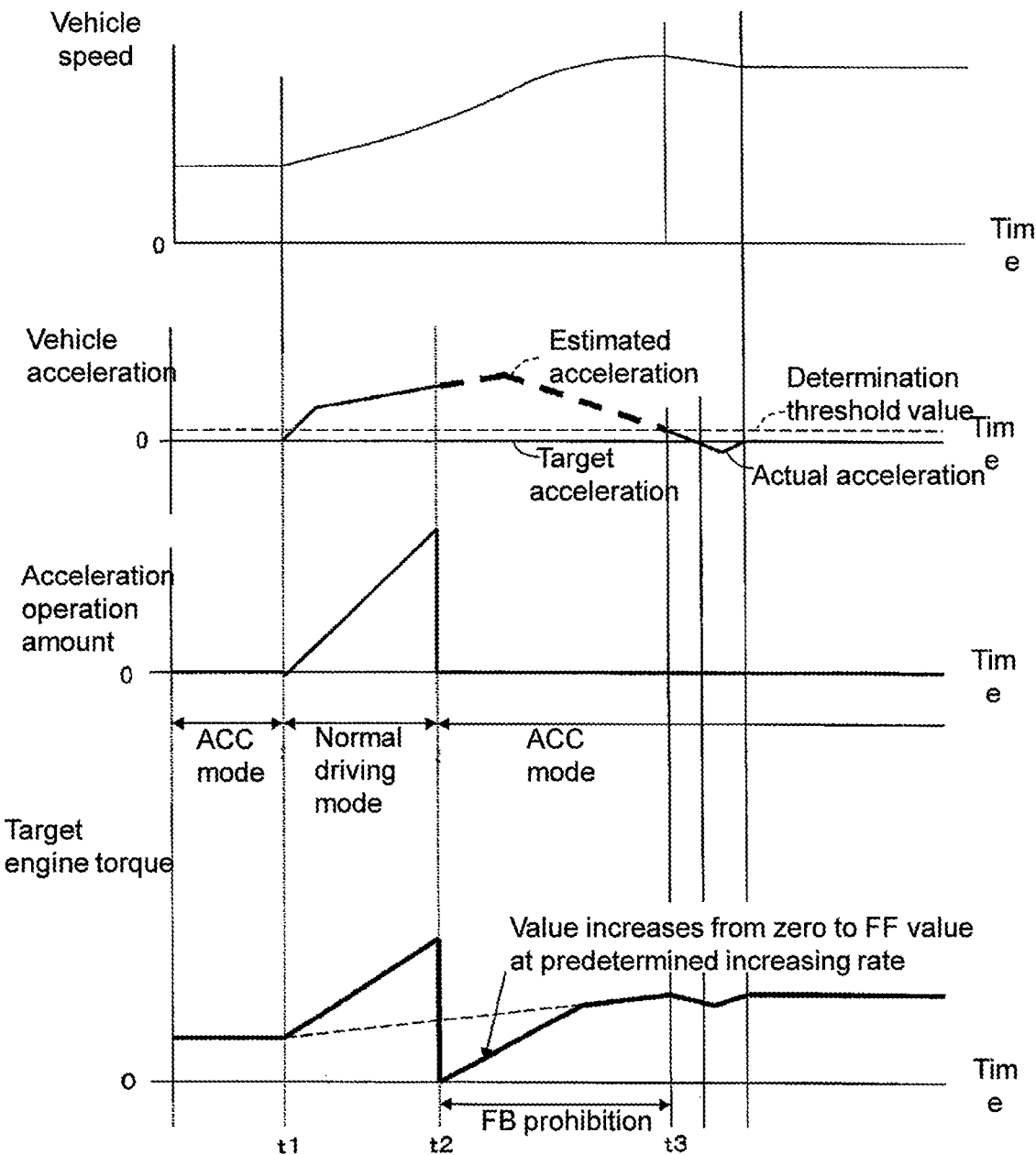
FIG. 5 is a time chart of a vehicle control device according to the present invention when the vehicle returns from steady traveling to ACC.

Further, the operation of the above-described vehicle control device 20 will be described with reference to the time chart in FIG. 5. FIG. 5 shows a time chart obtained when control returns from steady traveling to ACC. In FIG. 5, a vehicle speed, a vehicle acceleration (estimated acceleration and target acceleration), an accelerator operation amount, and a target driving force (target engine torque) are described in order from the top.

Until time t1, an ACC mode is set. When the accelerator operation is started at time t1 in the ACC mode, the normal driving mode is started.

In a period from time t1 to time t2, the normal driving mode is set. At this time, a target engine torque is set depending on an accelerator operation amount. When the accelerator operation is canceled at time t2, the above-described returning control is performed until time t3. That is, time t2 is the time point of returning, and, in the period from time t2 to time t3, the returning control is performed.

In returning control (automatic driving mode after the returning), the vehicle control device 20 performs specific control set based on the driving state of the vehicle in the normal driving mode before the returning. That is, the vehicle control device 20 calculates an estimated acceleration from the vehicle acceleration or the like in the period from time t1 to time t2, and calculates an estimated acceleration based on the vehicle acceleration and the like in the period from time t2 to time t3. The vehicle control device 20 prohibits the feedback control until the deviation between the estimated acceleration and the target acceleration becomes equal to or less than a predetermined threshold value (specific control).

In the specific control, the reference target driving force is set to zero at the time point of returning (time t2), and the target driving force is changed to the reference target driving force (target driving force related to FF control) at a predetermined change rate while the feedback control is being inhibited.

At time t3, when the differential acceleration becomes smaller than the determination threshold value, the returning control ends. The ACC is performed until the ACC is canceled after time t3.

Figure 6:
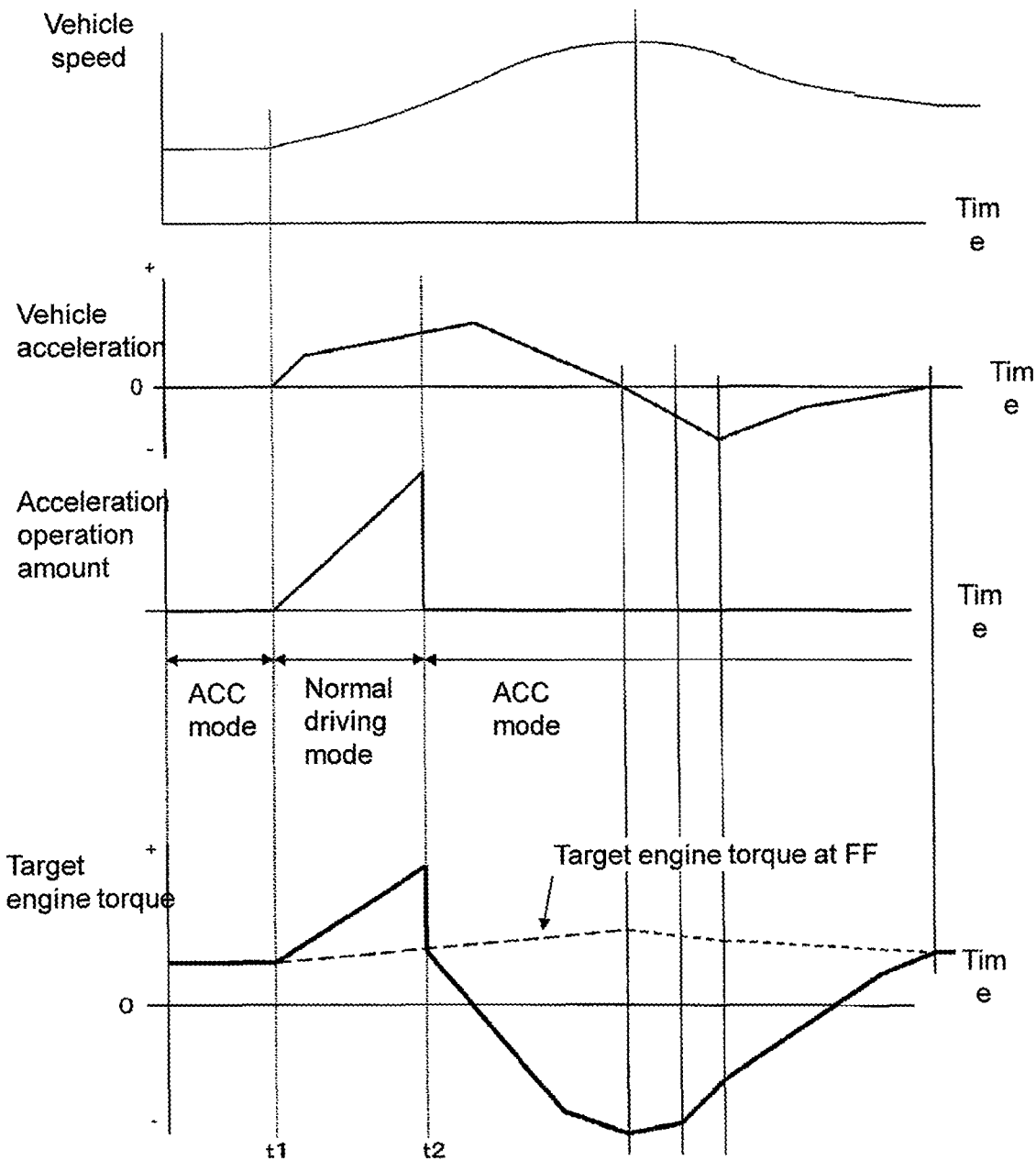
FIG. 6 is a time chart of a vehicle control device according to a comparative example when the vehicle returns from steady traveling to ACC.

FIG. 6 shows a time chart according to a comparative example when the vehicle returns from the steady traveling to the ACC. In this comparative example, as in the embodiment according to the present invention, when the specific control is not executed after the returning, and the FB control is not prohibited in a transition period in which a relationship between an engine torque and an actual acceleration is different from that in an usual case. In FIG. 6, a vehicle speed, a vehicle acceleration (actual acceleration and target acceleration), an accelerator operation amount, and a target driving force (target engine torque) are described in order from the top.

Only the points different from those in the embodiment according to the present invention will be described. In the comparative example, although the vehicle is returned from the normal driving mode to the ACC at time t2, the FB control is executed in a state in which the vehicle acceleration after the returning largely diverges from the target acceleration. As a result, the target driving force largely fluctuates after time t2. According to the embodiment of the present invention, the driving force can be suppressed from largely fluctuating.

Figure 7:
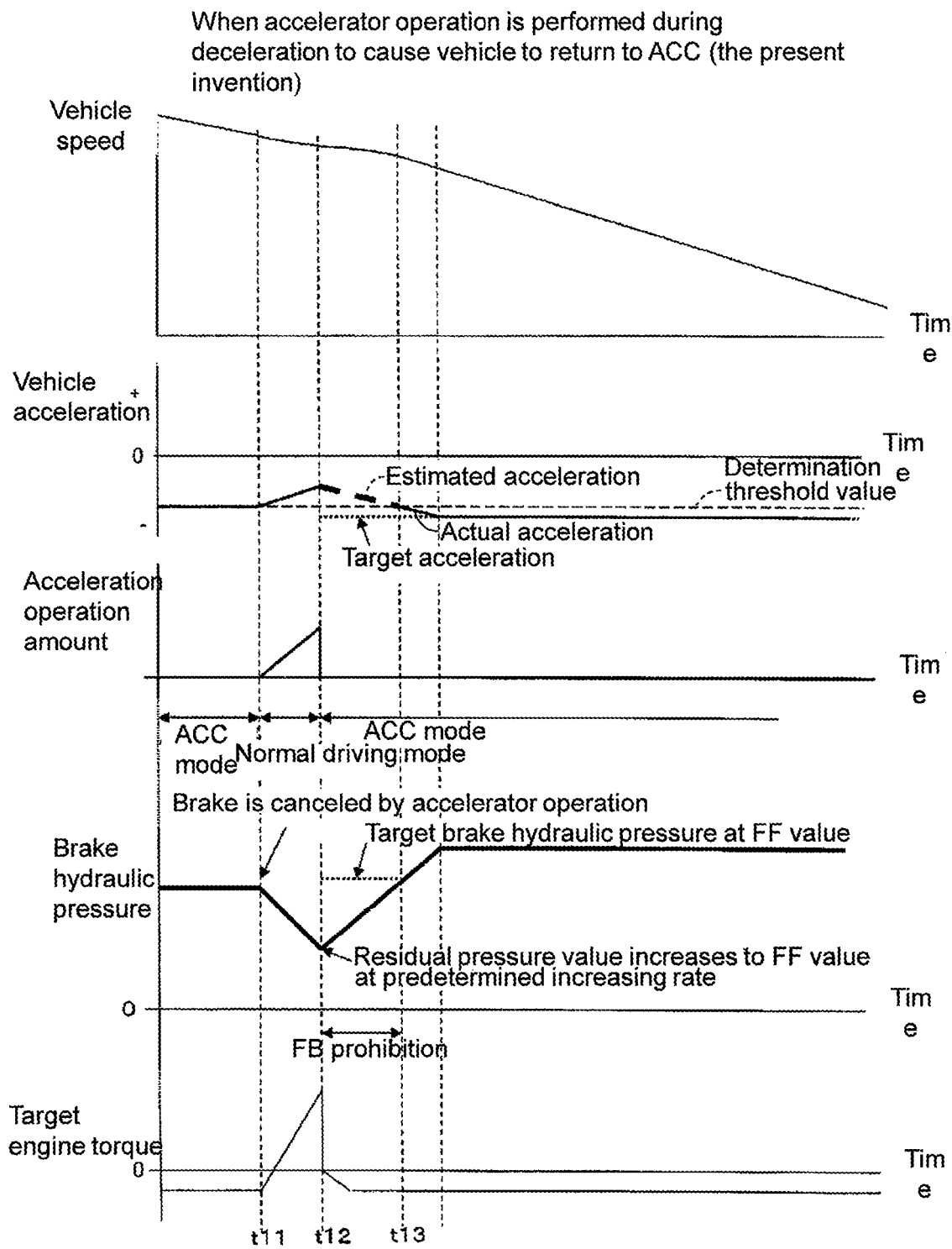
FIG. 7 is a time chart of a vehicle control device according to the present invention when an accelerator operation is performed during deceleration of a vehicle to return the vehicle to ACC.

Further, a case in which the accelerator operation is performed while the vehicle M is decelerated to cause the vehicle to return to the ACC will be described. Also in this case, the vehicle control device 20 executes processing according to the flowchart in FIG. 4. The operation of the vehicle control device 20 in this case will be described with reference to the time chart in FIG. 7. In FIG. 7, a vehicle speed, a vehicle acceleration (actual acceleration and target acceleration), an accelerator operation amount, a brake hydraulic pressure, and a target driving force (target engine torque) are described in order from the top.

Until time t11, the vehicle is in the ACC mode. When the accelerator operation is started at time t11 in the ACC mode, the normal driving mode is started.

In the period from time t11 to time t12, the normal driving mode is set. At this time, a target engine torque is set depending on an accelerator operation amount. At time t11, the automatic brake is canceled with the start of the accelerator operation. When the accelerator operation is canceled at time t12, the above-described returning control is performed until time t13. That is, time t12 is the time point of returning, and, in the period from time t12 to time t13, the returning control is performed.

In returning control (automatic driving mode after the returning), the vehicle control device 20 performs specific control set based on the driving state of the vehicle in the normal driving mode before the returning. That is, the vehicle control device 20 sets the braking force (brake residual pressure (described later)) generated at a time point immediately before the returning as the target braking force at a time point immediately after the returning and prohibits the FB control in the returning control (specific control). Further, thereafter, the vehicle control device 20 changes the brake hydraulic pressure at a predetermined change rate to the target brake hydraulic pressure by using the brake residual pressure as the start value (initial value) (specific control). The vehicle control device 20 controls the brake mechanism 18 so as to obtain the target deceleration (specific control).

At time t13, when the deviation between the estimated acceleration and the target acceleration becomes equal to or smaller than the predetermined threshold value, the returning control ends. The ACC is executed until the ACC is canceled after time t13.

FIG. 8 shows a time chart according to a comparative example when the vehicle returns from the steady traveling to the ACC. In this comparative example, as in the embodiment according to the present invention, the specific control is not executed after the returning, and the braking control is prohibited for a predetermined period of time. In FIG. 8, vehicle speed, a vehicle acceleration (actual acceleration and target acceleration), an accelerator operation amount, a brake hydraulic pressure, and a target driving force (target engine torque) are described in order from the top.

Only the points different from those in the embodiment according to the present invention will be described. In the comparative example, although the vehicle is returned from the normal driving mode to the ACC at time t12, since braking control is prohibited in a predetermined period of time, the brake hydraulic pressure decreases to zero, and the FB control is started from a time point when the prohibition of braking control is canceled. Thus, brake losing occurs. As a result, brake feeling is deteriorated. According to the embodiment of the present invention, such deterioration of the brake feeling can be suppressed.

As is apparent from the above description, the vehicle control device 20 of the present embodiment includes: the power train 17 (driving source) applying positive/negative driving force to the vehicle M; the brake mechanism 18 (braking mechanism) disposed independently of the power train 17 and generating braking force in the vehicle M; and an acceleration/deceleration control unit (vehicle control device 20) that controls the power train 17 or/and the brake mechanism 18 based on a target speed or a target acceleration to control an acceleration of the vehicle M, the vehicle control device 20 is configured such that, in an automatic driving mode in which the vehicle M is automatically driven regardless of an operation of a driver, after the automatic driving mode is temporarily stopped by a predetermined operation of the driver and switched to a normal driving mode in which the vehicle M is driven according to an operation of the driver, when the normal driving mode returns to the automatic driving mode, specific control set based on a driving state of the vehicle M in the normal driving mode before the returning is executed in the automatic driving mode after the returning.

According to this, when returning from the normal driving mode to the automatic driving mode in the automatic driving mode, the vehicle control device 20 performs specific control set based on the driving state of the vehicle M in the normal driving mode before the returning in the automatic driving mode after the returning. As a result, the driving mode can be smoothly returned from the normal driving mode to the automatic driving mode in the automatic driving mode.

The vehicle control device 20 also includes the vehicle acceleration estimation unit 22 that estimates an acceleration of the vehicle M in the automatic driving mode after the returning based on the driving state of the vehicle M in the normal driving mode before the returning, and the specific control prohibits feedback control related to the speed or acceleration of the vehicle M until a differential acceleration serving as a deviation between a vehicle acceleration estimated by the vehicle acceleration estimation unit 22 and the target acceleration becomes equal to or less than the determination threshold value after the time point of returning (in a period from time t2 to time t3).

According to this, in the automatic driving mode, when the vehicle returns from the normal driving mode to the automatic driving mode, an excessive change in acceleration can be suppressed from occurring in the vehicle M. Therefore, the vehicle can smoothly return from the normal driving mode to the automatic driving mode.

Further, the vehicle control device 20 includes the required torque output unit 31 (driving source control unit) controlling the driving force of the power train 17 based on the target driving force, and the reference target driving force calculation unit 28 calculating the reference target driving force serving as a reference of the target driving force based on at least one of the target speed and the target acceleration, and the specific control sets the reference target driving force to zero at the time point of returning and changes the target driving force at a predetermined change rate to the reference target driving force while the feedback control is being prohibited.

According to this, in the automatic driving mode, when the vehicle returns from the normal driving mode to the automatic driving mode, an excessive change in acceleration can be reliably suppressed from occurring in the vehicle M. Therefore, the vehicle can be more reliably and smoothly returned from the normal driving mode to the automatic driving mode.

Further, the vehicle control device 20 has the required torque output unit 31 (brake mechanism control unit) controlling the braking force of the brake mechanism 18 based on the target driving force, and the specific control sets the braking force generated at the time point immediately before the returning as the target braking force at the time point immediately after the returning.

According to this, in the automatic driving mode, when the vehicle returns from the normal driving mode to the automatic driving mode, a sudden change in deceleration can be suppressed.

The invention claimed is:

1. A vehicle control device comprising:
    a driving source applying positive/negative driving force to a vehicle;
    a braking mechanism provided separately from the driving source to generate a braking force on the vehicle; and
    an acceleration/deceleration control unit that controls the driving source or/and braking mechanism based on a target speed or a target acceleration to control an acceleration of the vehicle,
    wherein the acceleration/deceleration control unit is configured such that, in an automatic driving mode in which the vehicle is automatically driven regardless of an operation of a driver, after the automatic driving mode is temporarily stopped by a predetermined operation of the driver and switched to a normal driving mode in which the vehicle is driven according to an operation of the driver, when the normal driving mode returns to the automatic driving mode, specific control set based on a driving state of the vehicle in the normal driving mode before the returning is executed in the automatic driving mode after the returning,
    wherein the acceleration/deceleration control unit includes a vehicle acceleration estimation unit that estimates an acceleration of the vehicle in the automatic driving mode after the returning based on a driving state of the vehicle in the normal driving mode before the returning, and, in the specific control, until a differential acceleration, which is a deviation between the vehicle acceleration estimated by the vehicle acceleration estimation unit and the target acceleration, becomes equal to or less than a determination threshold value after a time point of the returning, feedback control related to the speed or acceleration of the vehicle is prohibited, and wherein the acceleration/deceleration control unit includes: a driving source control unit controlling driving force of the driving source based on a target driving force; and a reference target driving force calculation unit calculating reference target driving force serving as a reference of the target driving force based on at least one of the target speed and the target acceleration, and the specific control sets the reference target driving force to zero at the time point of returning and changes the target driving force at a predetermined change rate to the reference target driving force while the feedback control is being prohibited.

2. The vehicle control device according to claim 1, wherein the acceleration/deceleration control unit has a braking mechanism control unit that controls the braking force of the braking mechanism based on the target driving force, and the specific control sets a braking force generated at a time point immediately before the returning as a target braking force obtained at a time point immediately after the returning.

\* \* \* \* \*